Patented Mar. 28, 1944

2,345,006

UNITED STATES PATENT OFFICE 2,345,006

METHOD OF MAKING ESTERS

John Ross, Robert Louis Brandt, and Joseph Henry Percy, New York, N. Y., assignors to Colgate-Palmolive-Peet Company, Jersey City, N. J., a corporation of Delaware No Drawing. Application July 29, 1939, Serial No. 287,244

12 Claims. (Cl. 260—410.5)

This invention deals with the preparation of organic compounds, and in particular with the process of preparing aliphatic, aromatic, alicyclic or heterocyclic carboxylic acid derivatives of hydroxy substituted organic compounds as well as certain new products thereof.

It is well known that many carboxylic acid halides react slowly with phenols and many alcohols, and generally require a fairly high temperature or some catalytic aid to facilitate their combination. If acid halides are caused to react with phenols, a variety of products may be obtained, the proportions generally depending on the reaction conditions. Among the products which are generally obtained are hydroxy aryl ketones, aryl esters of carboxylic acids, and their derivatives.

Many methods have been devised and described for controlling the interaction of these organic compounds to obtain the particularly desired products. The type of product obtained usually may be controlled to an appreciable extent by the use of catalysts which facilitate the reactions in a manner which is incompletely understood. For example, the use of aluminum chloride and similar catalysts in the prior art methods of reacting acid halides with unsubstituted phenols or phenols having at least two replaceable hydrogens on the phenolic ring has generally led to the formation of hydroxy-aryl ketones. Under the conditions of preparing such ketones, it may be supposed that any phenol esters which may have been formed as an intermediate product must have been substantially converted to the hydroxy aryl ketone.

The preparation of pure esters of carboxylic acids is desirable but the prior art methods of effecting this result are not entirely satisfactory. The optimum conditions for reaction and the regulation of said conditions are both difficult to obtain. Furthermore, since many of the reactions are exothermic, the temperature of the mass would tend to increase as the reaction proceeds, thus promoting undesirable and uncontrolled side reactions in the heated condition.

Consequently, a great need has long been recognized for an effective method of greater control over the rate, direction, and other variables in this type reaction, and especially those variables which are influenced by catalysts. Many ways have been suggested to effect this control with varying degrees of success.

For example, the classical method for preparing phenol esters is that of Schotten and Baumann (Berichte der Deut. Chem. Ges., 17, 2545 (1884); 19, 3219 (1886)), in which an aqueous alkaline solution of a phenol is treated with the acid halide of the desired acid. In this method, certain disadvantages are found. The acid halides, generally insoluble in the aqueous alkali, form a separate phase, and the reaction mixture must be vigorously agitated to maintain intimate contact of the two phases. Furthermore, a portion of the acid halides reacts with the alkali to form salts, thus appreciably reducing the yield. To prevent hydrolysis of the aryl ester produced, the reaction mixture must be cooled by external means, and the temperature can be varied only within relatively narrow limits. In certain cases, where the hydroxy-aromatic compound is not stable to aqueous alkali, it is not possible to use this procedure. Other catalytic agents or media for conducting this reaction include pyridine, dimethyl aniline, alcoholic potash, and the like, but it is to be noted that in all these cases an alkaline catalyst or medium is employed which is reactive with the acid halides.

Furthermore, during the esterification reactions of these prior art methods, hydrohalides are evolved which combine with the alkaline catalytic agent or medium. For example, dimethyl aniline is converted to the hydrochloride thereof which does not possess the catalytic or solvent properties of the initial material. In fact, the hydrochloride is a solid material under ordinary conditions and its regeneration to the original amine is an expensive procedure.

Having in mind the defects, shortcomings and hazards of the prior art methods, it is an object of our invention to provide a novel and improved method for controlling these organic reactions so that esterification of the hydroxy organic compounds may be effected.

An object of the invention is also to provide a method of controlling the rate and direction of the reaction in which catalysts are employed. Another object is to provide a method of more easily purifying the products produced in these reactions. A further object is to provide a procedure for controlling these organic reactions, which procedure is easily adaptable to commercial or mass production. Additional objects will become apparent as the disclosures proceed and with understanding of the process.

It has now been found that when a hydroxy organic compound, e. g., phenol, is treated at a relatively low temperature with an acid halide in the presence of anhydrous aluminum chloride, anhydrous aluminum bromide, or other compounds of the class of anhydrous amphoteric metal halides, preferably in the presence of a suitable solvent, hydrogen halide is formed and there is obtained the ester of the carboxylic acid in excellent yield and purity.

The organic reactants may be dissolved in a solvent, preferably containing liquid sulphur dioxide, together, or separately with subsequent mixing, and the catalyst utilized may be added directly, or dissolved in any one of the solutions or in a separate portion which is mixed with the one containing the dissolved reactants. This procedure of mixing the materials, which may be in any order, may be accomplished in a very short time, say a few seconds, or may be regulated to cover a long period of time, say several hours, depending upon the nature of the reactants, the object to be attained, the control to be exercised, and other factors. Proportions of the solvent to each or all reactants (including catalysts) may be varied within very wide limits, and the conditions, such as temperature, pressure, etc., may also intentionally vary within wide limits at all times. For instance, it may be desirable to preheat or precool the various solutions or solution before the reaction begins, or the pressure upon the system may be varied as desired.

The invention is particularly valuable in the preparation of aryl esters by the reaction between an acidic carboxylic acid compound and a phenol having at least two replaceable hydrogens on the phenolic ring, with or without other reactions of the types commonly known as the Friedel and Crafts reaction, although it is not limited thereto. The basic esterification reaction which may be accompanied by other reactions is preferably between one or more compounds having one or more mono- and/or polyhydroxy aromatic groups having at least two replaceable hydrogens on said phenolic ring, and one or more organic compounds having one or more carboxylic acid halide groups.

The additional reactions which may be conducted in conjunction with the esterification reaction include one or more of the following:

(1) The alkylation of the aromatic hydroxy compounds by reaction with olefines and/or with aliphatic halides (including aliphatic compounds which contain one or more halogens and/or olefine linkages in the molecule).

Examples of these reactions are:

$$RCH=CHR' + ArH + AlCl_3 \rightarrow RCH_2CH(R')Ar + AlCl_3$$
$$RCH_2X + ArH + AlCl_3 \rightarrow RCH_2Ar + HX + AlCl_3$$

(2) Polymerization, isomerization, condensation and cyclization of hydrocarbons and their derivatives, including saturated and unsaturated aliphati, cyclic, alicyclic, aromatic and substituted aromatic hydrocarbons and many of their derivatives.

Examples are:

The polymerization of diisoamylene catalyzed with aluminum chloride.

The isomerization of normal pentene to give isoamylene and trimethyl ethylene.

(3) The acylation of the nucleus of the aromatic hydroxy compounds by reaction with carboxylic acid halides or carboxylic acid anhydrides.

Example:

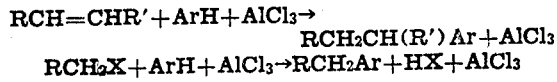
$$RCOX + ArH + AlCl_3 \rightarrow RCOAr + HX + AlCl_3$$

In the above examples, which are illustrative only and in no sense limiting, R and R' may be hydrogen, hydrocarbon residues, or substituted hydrocarbon residues; Ar represents an aromatic radical which contains at least one hydroxy group and which may or may not contain other substituent groups but has at least two replaceable hydrogens on the phenolic ring; H is hydrogen; X is a halogen atom. One or more catalysts may be utilized for these as well as the esterification reaction.

Although aluminum chloride is the preferred catalyst, other amphoteric metal halides, preferably in the anhydrous state, may be advantageously used, such as the chlorides and fluorides of titanium, antimony, boron, tin, iron (ferric), aluminum, indium, and zinc, as well as bromides and other halides of these metals and other salts having a similar catalytic effect, whether liquid, solid or gaseous, and various mixtures of said halides. These salts generally contain a plurality of halogen atoms in the molecule and are generally described as acid-reacting metal halides. Moreover, a mixture of two or more such metal halides may be used more advantageously in some cases than a single salt and/or mixtures thereof with other salts such as ammonium chloride, sodium chloride, etc.

Suitable solvents or suspending media are benzene, toluene, xylene, ethylbenzene, diphenyl, naphthalene and other aromatic hydrocarbons as well as their nitro-, halogeno-, and other suitable derivatives such as nitrobenzene; ethylene dichloride, chloroform, carbon tetrachloride, perchlorethylene, trichlorethylene, dichlorethylene, ethyl bromide, ethyl chloride, dichloro-difluoromethane and other halogenated hydrocarbons; methane, ethane, propane, butane, pentane, and other alkanes; cyclohexane, decalin, tetralin and other cycloaliphatics; petroleum ether and gasoline; dioxane and other ethers; carbon disulphide; liquid carbon dioxide; liquid sulphur dioxide; similar media or solvents, and mixtures thereof. It is preferred to employ a solvent or solvent combinations which will dissolve all reactants. The reaction may be carried out at any desired temperature from —40° C. to about 100° C. preferably by the choice of a suitable medium, as dictated by the reactivities of the particular starting materials employed. The reaction is usually conducted at a temperature not greater than 100° C., preferably no higher than 70° C., and advantageously below 35° C., and it should be below the temperature at which the Fries migration takes place at a substantial rate.

It has been discovered by the present applicants that many disadvantages encountered heretofore may be overcome by the use of solvents, preferably including liquid sulphur dioxide, as a reaction solvent in processes of the types mentioned above. Among the advantages realized by the use of solvents, the following are worthy of mention, though not exhaustive: It is possible to dissolve organic compounds, metal halide catalysts, and intermediates (such as organo-metallic complexes), involved in these reactions, hence it is possible to produce a homogeneous mixture and to conduct single phase reactions in inert media. Lower temperatures are facilitated by virtue of the low melting point of the solvents, which lower temperatures permit the reaction in liquid phase normally below the melting point of the materials being reacted, and therefore esterification may be effected rather than ketonization which normally resulted by the prior art higher temperature methods. The accompanying condensation reactions of the Friedel and Crafts type may be readily carried out in the solvent with a minimum of undesirable side reactions, and higher yields than heretofore achieved may be generally realized in even shorter time. Temperature control can be readily achieved due to the low boiling point of the solvents, their ease of handling at low temperatures, good heat transfer, and other physical properties. Pure and relatively uniform compounds are more easily prepared therein. The solvents are easily removed and the treatment of the final product with water when necessary and removal of certain solvents may be done in one operation. Noninflammable combinations can be prepared so that fire hazards may be eliminated. With a suitable solvent, all reactants may be brought into solution, giving a homogeneous mixture and resulting in more uniform and more rapid reaction. By the use of solvents the process is readily adapted to either batch or continuous operation, as desired. In many cases, the reaction may be carried out at temperatures below 0° C., tending to prevent side reaction and result in purer products. For example, when liquid sulphur dioxide is employed as a solvent, the temperature is easily held below −5° C. by allowing the solvent to reflux or to boil off at atmospheric pressure.

Also, in many cases by the process of this invention it is not necessary to employ the carboxylic acid halide as such. The corresponding carboxylic acid or even anhydrides may be used and converted to the acid halide in the reaction mixture by known means, as for example, by the use of thionyl chloride, excess aluminum chloride, or similar catalyst, or similar reagents.

In one embodiment of the invention, the hydroxy organic compound and anhydrous metal halide are mixed, either alone or in a suitable solvent, and the acid halide added gradually, alone or in solution. After the desired time has elapsed at the proper temperature, the mixture is poured on ice and the organic layer that separates washed successively with dilute acid, dilute alkali (rapidly), and water, and dried. On distilling off the solvent, the residue consists of the desired reaction product of a degree of purity sufficient for many industrial uses.

We have also found that the amphoteric metal halides catalyze the esterification reactions already outlined, when used at low temperatures and when liquid sulphur dioxide is employed as part or whole of the reaction medium. Thus these catalysts are effective under such conditions to bring about esterification of the hydroxy aromatic compounds as well as alkylation of the aromatic nucleus by olefines and by alkyl halides, preparation of ketones by acylation of the aromatic nucleus, and other desired reactions. It is characteristic of these reactions in solutions, such as in liquid sulphur dioxide, that they proceed smoothly and selectively, other substituent groups being usually unaffected.

In carrying out the reactions in liquid sulphur dioxide solution or in a mixed solvent comprising liquid sulphur dioxide and another liquid, we prefer to dissolve the reactants successively in the solvents and then slowly add the catalyst, in powdered form or in solution in liquid sulphur dioxide, to the mixture, with stirring. The period for addition of the catalyst may be from a few seconds to thirty minutes, or longer, depending upon the vigor of the reaction and/or the amount of agitation and cooling. After the catalyst has been added, the solution is stirred as long as necessary, generally five minutes to several hours. When the operation is carried out at temperatures and pressures and under other conditions which permit the removal of any sulphur dioxide through volatilization, it is desirable to provide for adding sufficient liquid sulphur dioxide to the mass in order that the volume may be kept approximately constant.

After the time has elapsed during which the reaction has progressed to the desired degree, the reaction mixture is poured gradually with stirring into ice water, and during this operation most of the liquid sulphur dioxide will volatilize. This may be done in suitable vessels and equipment in which the volatility of the sulphur dioxide is increased or accelerated by reducing the pressure in the system. Furthermore, the solvent vapor may be condensed and recovered for use again in the same or another process. In many cases the nature of the products will permit increasing the temperature of the mass to about room temperature or slightly higher, after the water treatment, to drive off a substantial amount or all of the remaining solvent. The separation of the product from the aqueous solution or mass, including the unreacted compounds and catalyst, may be effected by known methods. The above procedure is merely to illustrate a preferred method and this invention is not limited in any sense thereby.

The following examples are given to illustrate the application of this new and improved process to many types of reactions, but they are not intended to be limiting on the scope thereof. Other applications will become apparent to one skilled in the art with an understanding of the principles of this invention as carried out in these instances.

*Example I*

35 grams of benzoyl chloride and 24 grams of phenol were dissolved in 300 milliliters of liquid sulphur dioxide, and 40 grams of anhydrous aluminum chloride were added in portions during 10 minutes. The color of the solution remained yellow until the last few grams were added, when the color changed to brown with vigorous ebullition of the sulphur dioxide and separation of crystalline material. The mixture was stirred for 3 hours, and poured into ice and dilute sulphuric acid. After the hydrolysis, the mixture was extracted with ether and the ether extract was washed with dilute sodium hydroxide. Three grams of benzoic acid were recovered by acidification of the alkaline wash. The neutral ether extract was dried and the ether distilled off on the water bath, leaving 47 grams of colorless liquid phenyl benzoate, which solidified on standing to a white solid, M. P. 68°–70°. Yield 94%.

*Example II*

14 grams of resorcinol and 38 grams of benzoyl chloride were dissolved in 300 milliliters of liquid sulphur dioxide, and 40 grams of anhydrous aluminum chloride were added in portions during ten minutes. After stirring four hours, hydrolysis gave a yellow solid which was filtered off and washed with 5% sodium hydroxide solution. The alkali-insoluble material consisted of 30 grams of resorcinol dibenzoate, melting at 85°–104° C. Recrystallized once from alcohol, the material melted at 115°–116° C. Yield 75%.

Acidification of the alkali washes gave 7 grams of material which was probably largely resorcinol monobenzoate.

*Example III*

The procedure of Example I was repeated, using 35 grams of benzoyl chloride, 12 grams of phenol, and 40 grams of anhydrous aluminum chloride, with a reaction time of four hours. Treatment of the reaction mixture with water gave a semi-crystalline organic layer. Extraction of the entire mixture with a small amount of ether, followed by a small amount of petroleum ether, left behind a quantity of undissolved crystalline material, which was filtered off. This material weighed 12 grams and was the benzoate of p-hydroxybenzophenone, melting at 109°–113° (M. P. 112°–114° after recrystallization from alcohol). The ether and petroleum ether extracts were mixed and washed successively with dilute alkali and with dilute acid. The neutral extract was dried and the ether distilled off on the steam bath, leaving 20 grams of phenyl benzoate, M. P. 49°–56°. Yield, 32% p-benzoyl-phenyl benzoate; 70% phenyl benzoate.

*Example IV*

24 grams of phenol and 40 grams of anhydrous aluminum chloride were dissolved in 300 cc. benzene, and 35 grams of benzoyl chloride added dropwise with gentle stirring. The temperature rose to 45° C. After stirring for 1½ hours, the reddish mixture was poured into ice-water. The organic layer was separated and washed successively with dilute acid, dilute alkali, and water, dried, and the benzene distilled off. The residue was 45 g. of phenyl benzoate, M. P. 65°–69°. Yield 90%.

*Example V*

36 grams of beta-naphthol and 10 grams of anhydrous aluminum chloride were dissolved in 400 cc. ethylene dichloride, and 35 grams of benzoyl chloride added dropwise with gentle stirring. After stirring for ½ hour at 35° C. the yellow mixture was poured into ice-water. The organic layer was separated and washed with dilute alkali and dried, and the ethylene dichloride distilled off. The residue was 51 g. of beta-naphthol benzoate, M. P. 102°–106°. Yield 82%.

*Example VI*

45 parts by weight of lauryl alcohol and 54.6 parts by weight of lauric acid chloride are dissolved in 300 parts by volume of chloroform, and 40 parts by weight of aluminum chloride are added thereto. The mixture is stirred for about 1 hour, the temperature being maintained below 35° C. The reaction mixture is then poured into dilute sulphuric acid and ice. The chloroform layer is separated and washed thoroughly with dilute acid and quickly with dilute alkali and finally with water. It is then dried and the solvent removed by distillation. The residue is distilled under a pressure of about 5 mm. A fraction of about 58 parts of lauryl laurate boiling between about 220° and 240° C. is obtained.

In most cases, it will be found advantageous to carry out these reactions in apparatus suitably equipped with stirrers or agitators, valves, pressure gauges, jacketed autoclaves, or reaction vessels, etc., in which the pressure may be varied as desired, and to which artificial heating or cooling means, such as steam or cooling water, may be applied (the steam or cooling water will be circulated in indirect contact with the solution of reactants) in order that temperature control may be assisted. Direct cooling may be employed in the reaction vessel by vaporization of part of the solvent employed.

As hereinbefore mentioned, the concentration of any of the reactants or of the catalyst or mixture of catalysts in solution in the solvents may be varied to accomplish desired results. For instance, where the reaction between two organic compounds would ordinarily be violent, the concentration of one or both may be made very low, or the quantity of catalyst added thereto may be gradual by using a very dilute solution thereof.

Among the phenols which may be esterified are phenol, alkyl phenols, resorcinol, alkyl resorcinol including hexyl resorcinol, pyrogallol, salicylic acid, salicylic acid esters, alpha naphthol, beta naphthol, dihydroxy naphthalene, salol, eugenol, iso-eugenol, chloranol, hydroxyhydroquinol, hydroquinol, hydroxyquinoline, hydroxyphenyl-methylol, benzoylphenol, hydroxybenzoylphenol, guaiacol, cresol, diphenol, hydroxy diphenyl, diethylmeta-amino phenol, pyrocatechol, rufigallol, rufigallic acid, rufol, ruflopin, hydroxy aniline, amino-naphthol, diphenol amine, their derivatives and various mixtures thereof.

The carboxylic acid compounds which may be reacted preferably contain at least five carbon atoms and include valeric acid and the other fatty acids of longer chain length such as stearic acid, melissic acid, lauric acid, palmitic acid, cerotic acid, behenic acid, myristic acid; unsaturated fatty acids such as oleic acid, ricinoleic acid; polybasic acids such as sebacic acid, maleic acid, succinic acid and oxalic acid; aryl acids such as benzoic acid, chlorphthalic acid, benzoyl benzoic acid, salicylic acid, naphthoic acid, phthalic acid, anthranilic acid, salicylic acid ethers, oxytoluic acid, amino-salicylic acid; heterocyclic acids such as nicotinic acid, picolinic acid, quinolinic acid, lutedinic acid, furoic acid, fucosic acid; and other acids and their derivatives such as carbamic acid, chlorcarbonic ester, phosgene, glycollic acid, diglycollic acid, ethoxyacetic acid, aminoacetic acid, chloracetic acid, pyromellitic acid, hydroxyphenyl-stearic acid, phenyl stearic acid, naphthenic acid, acrylic acid, methacrylic acid, crotonic acid, oxidized petroleum acids, the corresponding acid anhydrides and acid halides and various mixtures thereof.

The longer chain alcohols can be esterified by this method and among those which may be used alone or in conjunction with the phenols are cyclohexanol, methyl cyclohexanol, tetrahydronaphthol, decahydronaphthol, heptyl alcohol, octyl alcohol, nonyl alcohol, decanol, dodecyl alcohol, cetyl alcohol, oxidized petroleum alcohols, oleyl alcohol, stearyl alcohol, carnaubyl alcohol, myricyl alcohol, tetradecyl alcohol, cinnamyl alcohol, phenylethanol, their branch and straight chained isomers, and various mixtures thereof.

It is also possible to conduct an amidization reaction in conjunction with the other reactions. The amines which may be used include aniline, ethyl amine, mono-ethanol amine, di-ethanolamine, butylamine, amyl amine, ethyl aniline, alpha naphthylamine, beta naphthylamine, diamino-naphthalene, diphenyl amine, amino-diphenyl, di-amino diphenyl, ethyl naphthyl amine, and various other primary and secondary amines having aryl and alkaryl substituents.

The various reactants may be substituted with halogenonitro-, alkyl, cyclo-alkyl, aryl, sulphonate, hydroxy, amino-, mono and di- substituted amino-, and like groups which do not adversely affect the reaction.

It should be noted that it is possible for the first time by the process of this invention to conduct the esterification of a phenol having at least two replaceable hydrogens, in an acid medium, namely in the presence of an acid-reacting salt. Furthermore, it should be noted that the anhydrous acid-reacting metal salts are not the equivalent of strong mineral acid—sulphuric acid—which reacts to produce different products. It is a feature of this invention to prepare the esters with a catalyst normally employed at a high temperature for producing a different type product, namely ketones.

While the process is adapted to the preparation of individual chemical compounds, it is also possible to use various mixtures of the many reactants listed above. The products are adapted for use as or in production of germicides, dyes, photographic developers, perfumes, medicaments, deodorants, reodorants, insecticides, plasticizers, waxes, synthetic resins, wetting and deterging agents, pour-point depressants, solvents, tanning agents, antipyretic agents, disinfectants, flavors, and the like.

This application is a continuation-in-part of applicants' copending application Serial No. 221,352, now issued as United States Patent No. 2,245,721.

We claim:

1. The process of preparing esters which comprises reacting an organic hydroxy compound having at least six carbon atoms with a carboxylic acid halide in the presence of an amphoteric metal halide, while dissolved in a low-boiling inert solvent, and at a temperature not greater than 70° C.

2. The process of preparing esters which comprises reacting an organic hydroxy compound having at least six carbon atoms with a carboxylic acid halide in the presence of an anhydrous amphoteric metal halide, and at a temperature not greater than 35° C.

3. The process of preparing esters which comprises reacting an alcohol having at least six carbon atoms with a carboxylic acid halide in the presence of an anhydrous amphoteric metal halide, and at a temperature not greater than 35° C.

4. The process of preparing esters which comprises reacting a phenol having at least two replaceable hydrogens on the phenolic ring with a carboxylic acid halide in the presence of an anhydrous amphoteric metal halide and at a temperature not greater than 70° C.

5. The process of preparing esters which comprises reacting in the presence of an amphoteric metal halide, an organic hydroxy compound having at least six carbon atoms with a carboxylic acid halide while dissolved in a solvent comprising liquid sulphur dioxide and at a temperature not greater than 70° C.

6. The process of preparing esters which comprises reacting a phenol having at least two replaceable hydrogens on the phenolic ring with a carboxylic acid halide in the presence of an anhydrous amphoteric metal halide while dissolved in a solvent comprising liquid sulphur dioxide and at a temperature not greater than 35° C.

7. The process of preparing esters which comprises reacting a phenol having at least two replaceable hydrogens on the phenolic ring with a carboxylic acid halide in the presence of an active polyvalent metal halide catalyst of the Friedel-Crafts type and at a temperature not greater than 70° C.

8. The process of preparing esters which comprises reacting an organic carboxylic acid halide with an hydroxy aromatic compound while dissolved in liquid sulphur dioxide and in the presence of a Friedel-Crafts halide catalyst and at a temperature not greater than 70° C.

9. The process of preparing esters which comprises reacting a phenol having at least two replaceable hydrogens on the phenolic ring with a carboxylic acid halide in the presence of an amphoteric metal halide and at a temperature not greater than 35° C.

10. The process of preparing esters which comprises reacting a phenol having at least two replaceable hydrogens on the phenolic ring with a carboxylic acid halide in the presence of an amphoteric metal halide and at a temperature below 100° C. and that at which the Fries migration takes place at a substantial rate.

11. The process of preparing esters which comprises reacting an alcohol having at least six carbon atoms with a carboxylic acid halide in the presence of an anhydrous amphoteric halide and at a temperature not greater than 70° C.

12. The process of preparing esters which comprises reacting an alcohol having at least six carbon atoms with a carboxylic acid halide while dissolved in a solvent comprising liquid sulphur dioxide and at a temperature not greater than 70° C.

JOHN ROSS.
ROBERT LOUIS BRANDT.
JOSEPH HENRY PERCY.